April 11, 1961 E. LANGECKER 2,978,745
PROCESS AND A MACHINE FOR THE PRODUCTION OF HOLLOW BODIES
Filed June 3, 1957 6 Sheets-Sheet 1

Inventor:
ERHARD LANGECKER
By Irwin S. Thompson
ATTY.

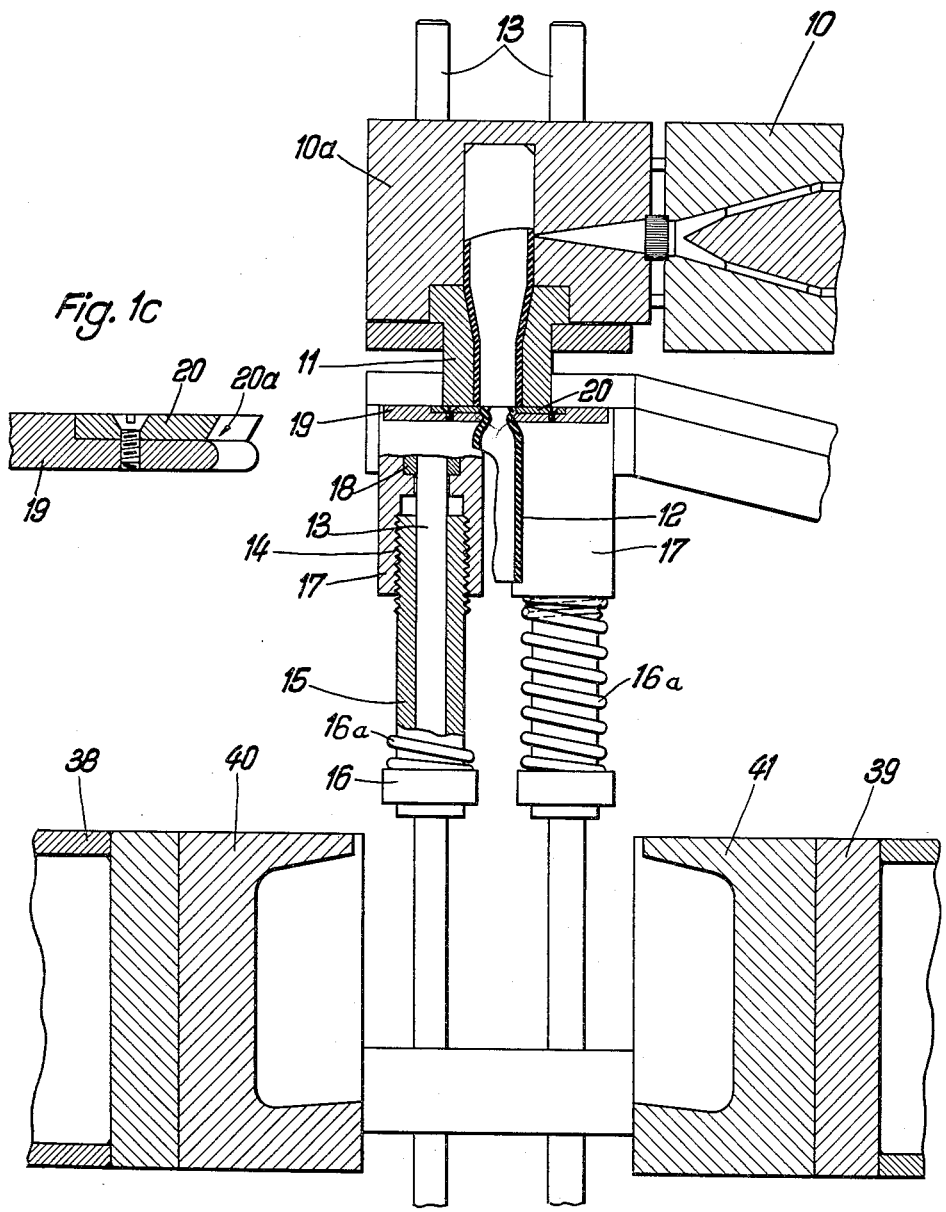

April 11, 1961 E. LANGECKER 2,978,745
PROCESS AND A MACHINE FOR THE PRODUCTION OF HOLLOW BODIES
Filed June 3, 1957 6 Sheets-Sheet 4

Inventor:
ERHARD LANGECKER
By Irwin S. Thompson
ATTY.

April 11, 1961 E. LANGECKER 2,978,745
PROCESS AND A MACHINE FOR THE PRODUCTION OF HOLLOW BODIES
Filed June 3, 1957 6 Sheets-Sheet 5
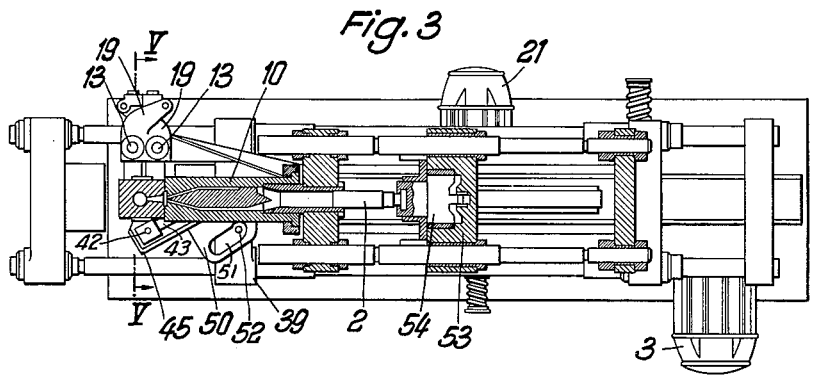
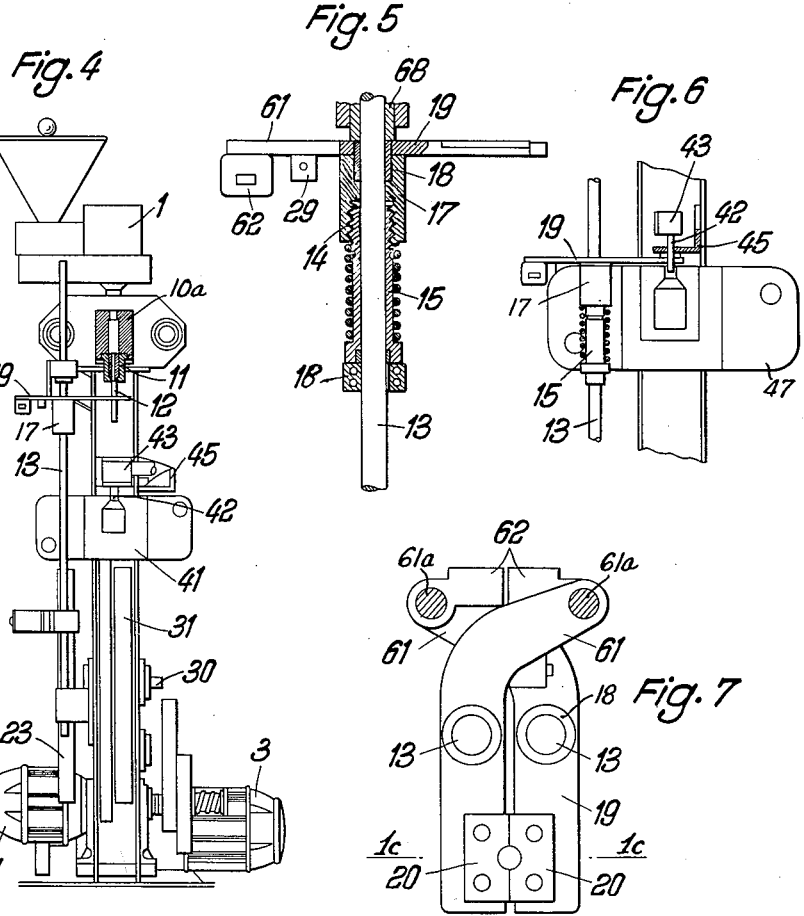
Inventor:
ERHARD LANGECKER
By Irwin S. Thompson
ATTY.

April 11, 1961    E. LANGECKER    2,978,745
PROCESS AND A MACHINE FOR THE PRODUCTION OF HOLLOW BODIES
Filed June 3, 1957    6 Sheets-Sheet 6

Inventor:
ERHARD LANGECKER
BY Irwin S. Thompson
ATTY.

United States Patent Office 2,978,745
Patented Apr. 11, 1961

2,978,745

PROCESS AND A MACHINE FOR THE PRODUCTION OF HOLLOW BODIES

Erhard Langecker, Meinerzhagen, Germany, assignor to Gebr. Battenfeld, Meinerzhagen, Germany, a German company Filed June 3, 1957, Ser. No. 663,258
Claims priority, application Germany Dec. 7, 1956
6 Claims. (Cl. 18—5)

It is already known to produce hollow bodies from thermoplastic synthetic materials by a blank, for example a tube or two strips which are joined together at their edges, being blown while still in the plastic state by means of pressure gas into hollow bodies. In this connection the tube or strips are produced either by a fly-press, extrusion press or ram press.

The treatment of these blanks in known devices is carried out in various ways. According to one method of production, for instance, a tubular blank is endlessly produced by an extrusion press and fed to a split mould, in closing of which a tubular section is nipped off and closed at both ends. Into these closed hollow bodies a hollow mandrel is then introduced and a pressure medium injected, which blows up the tubular section and presses it against the inside wall of the mould. With the known embodiments of such machines a large number of moulds are available, which are fitted in a disc rotating round a horizontal axis and arrive in succession in the operational position. The rate of feed of the tube must here be made to conform to the peripheral speed of the disc. There is nevertheless a relatively high loss of material between the individual moulds.

It has also been proposed to make the disc carrying the moulds rotate round a vertical axis, in which case the tube is extruded intermittently and fed between the halves of the mould. The air is admitted from above and the successive steps in the cycle of operations are controlled by a time regulator.

These two types of machine have on the one hand the disadvantage that in setting a rhythm of work the rhythms of work which follow are affected. Furthermore it is not possible to keep the width of the opening in the hollow body strictly to dimensions, as it is necessary, for example, in the production of bottles. To keep the necks of the bottles accurately to size, it is actually necessary to bore them out.

A machine has also been suggested in which the tube is extruded perpendicularly downwards and, between the halves of the mould, a mould is supplied in which a mandrel is inserted from below, which forms at the same time the mouthpiece of the air nozzle. The mould nips the tube at its upper end and closes it and presses the lower end round the mandrel, after which the tube is pressed against the wall of the hollow mould by blowing in air through the air nozzle.

This proposal avoids, it is true, part of the disadvantages of the proposals already mentioned, but it in turn has the disadvantage that the tube hanging perpendicularly to the extrusion mouthpiece, particularly when it has reached a certain length, is extended by its own weight and consequently the upper part of the tube which forms the base of the finished body, for example, a bottle, is weaker than the lower part, while the base of the bottle has to stand up to the severer stress.

The object of the invention is to remove all the disadvantages mentioned. This is effected in this way, that the tube hanging downwards and extruded from the extrusion nozzle is cut off by a cutter led to the nozzle, without the tube being nipped together, and the tube led downwards into the opened mould, after which a nozzle containing the air mandrel is swung in between the cut-off tube and the extrusion nozzle and inserted in the upper opening of the tube and then the mould is closed, whereby the tube is closed at its lower end by the mould and applied at its upper end round the mandrel, after which the hollow body is blown up in known manner by the air forced in through the mandrel and after the mould is opened, the body is stripped off the mandrel. Preferably the cutter holds the tube open at the top and guides it in its downward path between the two halves of the mould.

The invention also relates to a machine for carrying out the process mentioned, which is described in what follows.

It is effected by the invention that if in consequence of its own weight in suspension an alteration takes place in the distribution of the material of which the tube is made, the greater part of the mass lies at the base of the container. Furthermore the whole working cycle is run through independently and any alteration in timing of part of the process does not affect the other operational processes.

The accompanying drawings show by way of example an embodiment of the invention, where Figure 1 is a view of the machine from the operating side, partly in section.

Figure 3 is a plan view from above of Figure 1, in part section in the direction of the line III—III in Figure 1.

Figure 4 is a front view of the machine with parts in section.

Figure 5 is a section in the direction of the line V—V in Figure 3.

Figure 6 is a magnified representation of part of Figure 4.

Figure 7 is a view from above on Figure 5, in which Figure 5 is rotated through 90°.

Figure 1:
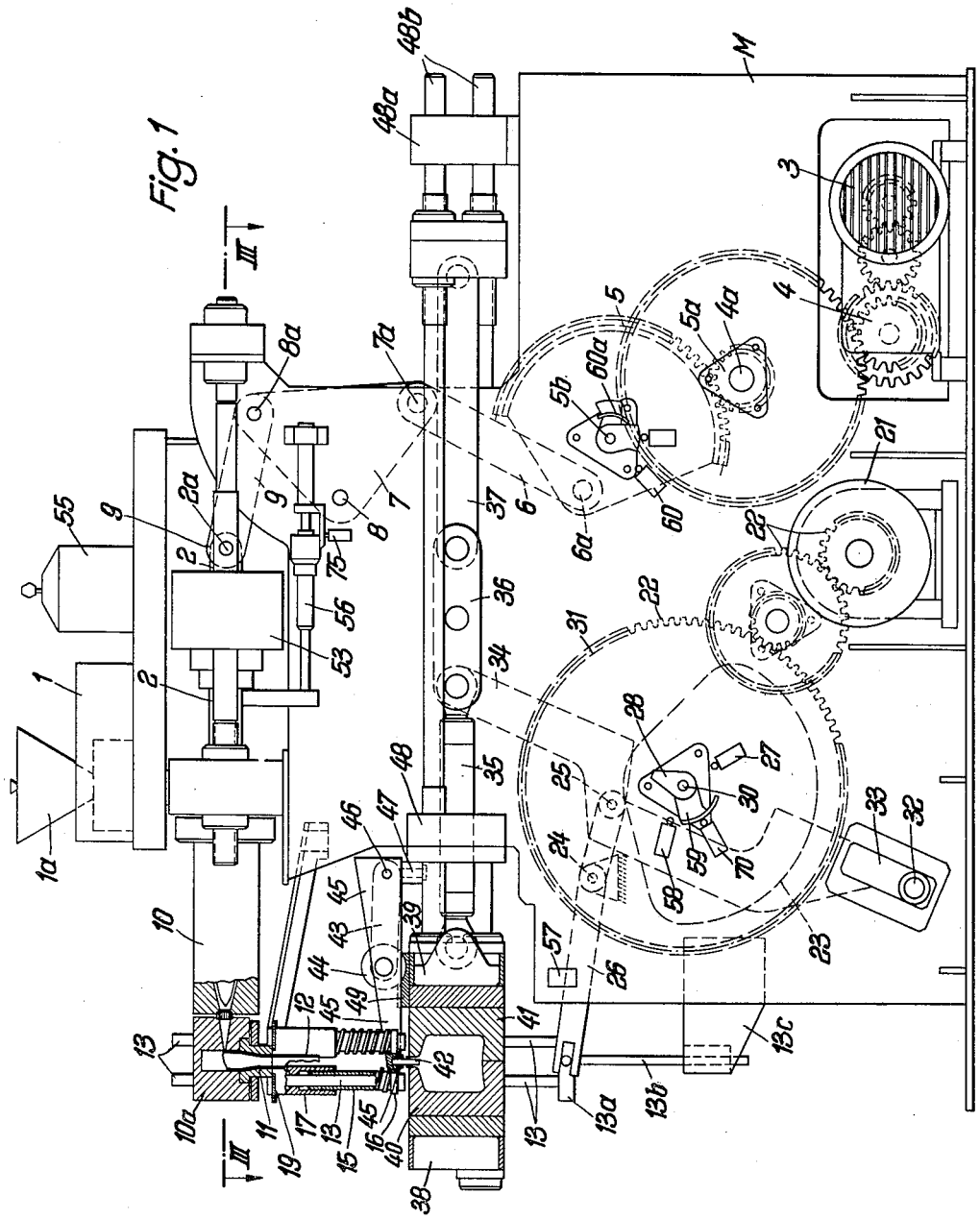
Figure 1a is a part of Figure 1 to an enlarged scale.
Figure 1b is a view similar to Figure 1a and shows the different devices in another position.
Figure 1c is a detail of Figure 1b to a still further enlarged scale, the figure being a section through one half of Figure 7 on the line 1c—1c thereof.

In the drawings M is the frame of a machine for the production of hollow bodies by extrusion carrying at its upper side an automatic weighting device 1 constructed in a known manner. It weighs the material fed to it in powder form to the amount required for the pressing to be produced and pours it out at the beginning of each operational cycle in front of the press ram 2 (Figs. 1 and 3), moving to and fro within the pressing or plastification cylinder 10. The press ram 2 is driven by an electric motor 3 which is controlled by a switch (not shown in the drawings) which is switched on by a time switch when time is up, in a manner known per se, and sets in motion the electric motor 3 accommodated in the machine frame. The motor 3 actuates a shaft 4a, via a set of toothed gears 4, said shaft being supported in the machine frame and driving, via a toothed gear 5a, a segmental wheel 5 (Figs. 1 and 2), which is constructed as a crank disk and drives a rocker arm 7 by a link 6, the one end of which is pivoted at 6a to the said crank disk 5 and the other end of which is pivoted at 7a to the said rocker arm 7, which latter is swingable around a pivot 8. The rocker arm is connected with the press ram 2 by a link 9, the one end of which is pivoted to the said rocker arm 7 at 8a and the other end of which is pivoted to the press ram 2 at 2a. The rocker arm presses, when swinging around the pivot 8, the press ram into the plastification cylinder 10 or draws it out of it (Figs. 1 and 3). The mass of material leaves the cylinder 10 through the cylinder head 10a and the nozzle 11 as a tube 12.

Next to the nozzle two push rods 13 are supported in the machine frame, which rods may be displaced vertically, i.e. in their longitudinal direction. The two push rods are connected with each other at their lower ends by a cross rod 13c to which a guiding rod 13b extending downwardly is fastened, said guiding rod being adapted to slide in a guide 13a fastened at the machine frame M. On each of these push rods 13 there fits slidably a bushing 15 (see also Fig. 1b) provided at its exterior with a coarse thread 14. The bushings 15 are carried along by the upward movement of the push rods 13 by means of collars 16 fastened on the push rods. The coarse thread 14 of the bushings 15 each engages in a bushing 17 provided with an inner coarse thread and arranged slidably along the push rods 13. The two bushings 17 are each provided with a hollow spindle 18 on which cutter arms 19 are seated. The cutter arms are secured to the hollow spindles 18 in such a way that they move with them along the rods 13 and rotate with them around said rods.

At the one free end of the cuter arms cutter plates 20 are provided (see also Figs. 1b, 1c and 7), whose cutting edges form, together with the portion of the cutter arm lying therebelow, recesses 20a of hemispherical cross section having such a diameter that the cutter plates 20 cut through the tube while the severed portion of the tube is held also after being severed due to the penetration of the tube material into the recess 20a without pressing the opening of the tube together (see Fig. 1b). In the initial position, the cutter arms are open and are positioned below the nozzle in spaced relation thereto.

Figure 2:
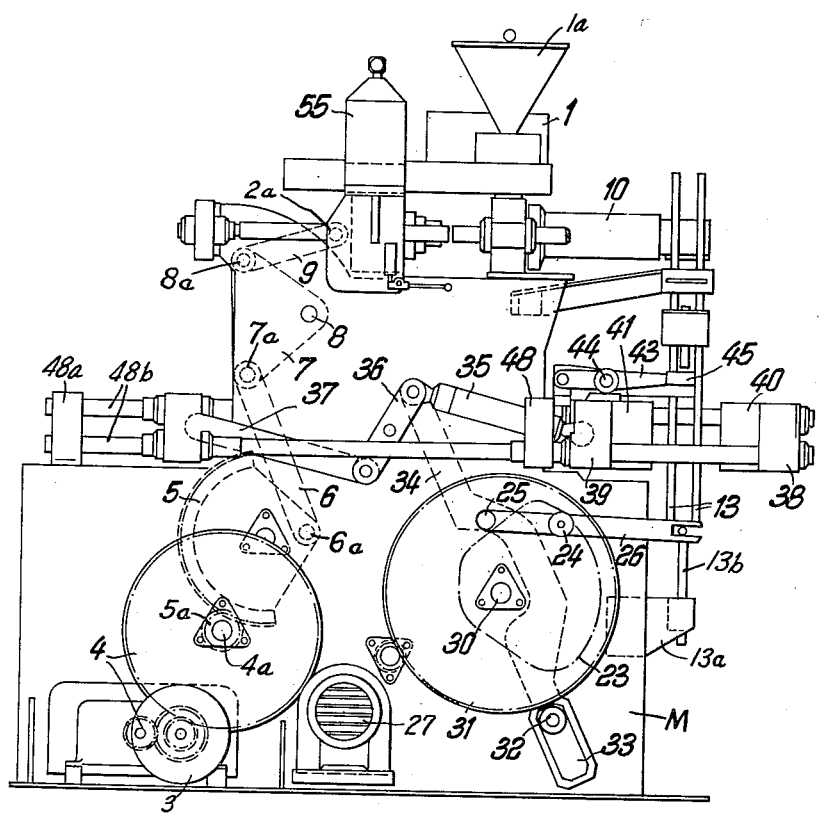
Figure 2 is a view of the side of the machine opposite Figure 1 with a rather different setting of the different devices.

The cutter drive is effected and automatically controlled by a motor 21 (Figs. 1, 3 and 4) which is also accommodated in the machine frame M and drives by toothed gears 22, 31 a shaft 30. This shaft carries a cam 23 which is seen in Fig. 1 in dash lines. A roller 25 engages said cam and is mounted at the free end of a rockable lever 26 which may oscillate on a pivot 24 supported by the machine frame (Figs. 1 and 2). The other, forked end of the lever 26 engages the cross rod 13c connecting the push rods 13 and raises and lowers this cross rod and thereby also the said push rods and the bushings provided thereon with the cutter arms 19, 20 which, at the beginning of the operational cycle, are in their ready position about 2 cm. below the under surface of the nozzle. The cam 23 is adjusted on the shaft 30 in such a way that first the cutter arms are caused to approach the nozzle during the extrusion of the tube and then the cutter arms engage a stationary abutment 68 (Fig. 5) and are stopped after a sufficient length of the tube 12 has been extruded. Thus, if the sleeves 15 are further raised by the push rods 13, the coarse thread 14 causes a rotation of the sleeves 17 with the hollow spindles 18 and of the cutting arms 19 around the rods 13 relatively to the sleeves 15 and the cutting plates 20 sever the tube. Then the closed cutter arms with the severed portion of the tube hanging thereon are lowered as the cam disk 23 continues to rotate so that the tube comes into the opened mould 40, 41, the manner of operation of which will be described later on.

Between each of the collars 16 and the respective bushing 17 a spring 16a is inserted which tends to press the respective sleeve upwardly and to open the cutters or hold them opened respectively if the cutters do not engage the abutment 68.

Upon further continuation of the rotation of the cam disk 23, the cutting arms are again raised into their initial position, in the manner still to be described, and finally the motor 21 is switched off by an automatic terminal switch 27 which is actuated by a cam 28 on the shaft 30.

It is possible to stop the upward movement of the cutter arms by a stop contact 29 (Fig. 5) fitted to the cutter arms. When this contact is actuated, it cuts out the motor and thereby stops the movement of the cutter arms.

On the shaft 30 there is located inside the machine, i.e. between the two side walls of the frame M of the machine, a cam plate which is not visible in Fig. 1 and which drives a lever 34. This lever carries at one end a roller 32 guided in a slot 33 provided in the machine frame. The other end of the lever 34 is connected with two knuckle joints 35, 36, 37, the ends of which joints are pivotally connected to the mould closure plates 38 and 39 for to and fro movement. The two mould closure plates 38, 39 carry respectively the blower mould halves 40 and 41.

Figure 1A:
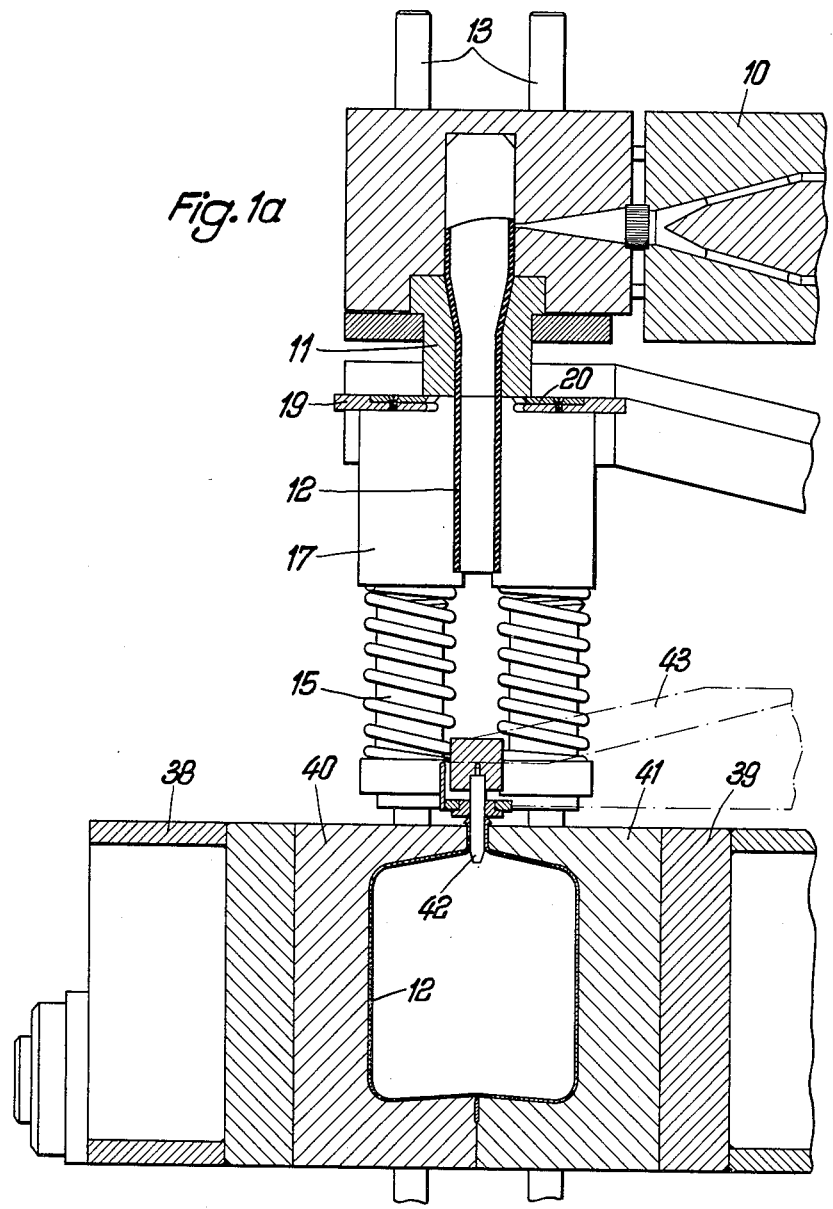

Figs. 1 and 1a show the blower mould in the closed position in which the knuckle joints are stretched, and Fig. 1b shows it in the opened position.

Figure 8:
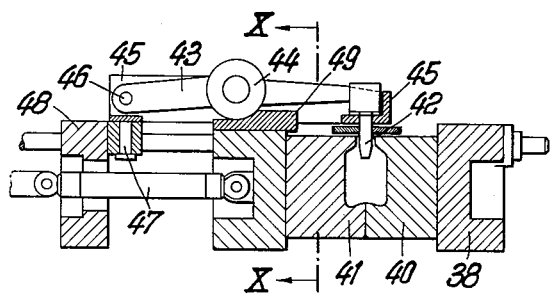
Figure 8 is a representation of the lifting and lowering device of the blower mandrel as a section in the direction VIII—VIII in Figure 9.

For blowing up the extruded tube, a blower mandrel 42 is provided which is fitted to a lever 43 (Figs. 1 and 8). This lever is provided with a cam roller 44 and is supported on a stripper lever 45 which serves to strip the ready-blown workpiece from the blower mandrel so as to enable the mandrel to swivel up and down around a spindle 46 relative to lever 45, and the two levers 43 and 45 are supported on the guide plate 48 so as to be able to swivel around a perpendicular pivot 47. The guiding plate 48 which is stationary in the machine frame serves together with a further guiding plate 48a (Fig. 2) for supporting the two cross beams 48b on which the mould closure plates 38, 39 are guided.

Figure 9:
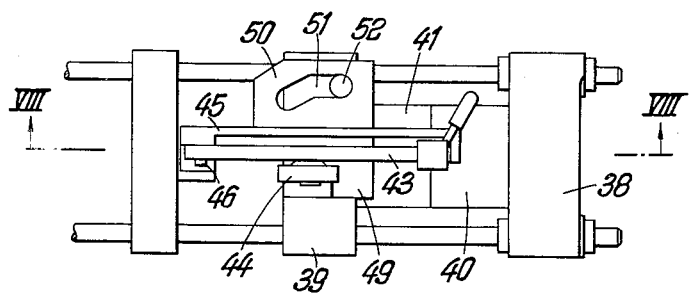
Figure 9 is a view of the mandrel swivelling device.
Figure 10:
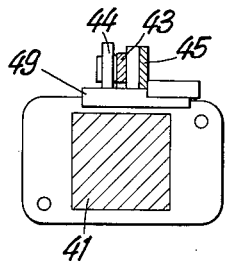
Figure 10 is a section through Figure 8 in the direction of the line X—X.

The roller 44 on the lever 43 runs on a cam plate 49 (Figs. 1 and 8) fixed to the mould closure plate 39 and raises and lowers the lever 43 relative to lever 45 with the blower mandrel during the reciprocating motion of the mould closure plate. To the lever 45 a plate 50 (Figs. 3 and 9) is fixed which has a slot 51 in which travels a roller 52 supported at the mould closure plate, so that when the mould closure plate 39 is displaced, the levers 43 and 45 are swivelled sideways around the pivot 47. The stripper lever 45 engages with its free end around the blower mandrel (see also Fig. 8), so that when the mandrel moves upwardly, the upper end of the blown workpiece engages lever 45 and is stripped from the mandrel.

After the blower mandrel 42 has been inserted into the mould and the stripper lever 45 is brought into its working position, compressed air is admitted to the blower mandrel and the tube within the blower mould is blown up. Thereupon the electric current exciting the electromagnets 62 is switched off so that the said magnets release the cutters, whereupon the springs 16a press the bushings 17 upwardly and cause them to rotate around the sleeves 15 by the action of the coarse thread 14, thereby turning the cutters in opposite directions and opening them. The opened cutters may then be raised into their initial position by the continued rotation of the cam disk 23, as the cutter arms are, in the opened position, clear of the blowing mandrel and the stripper means.

In the drive of the press ram 2 a hydraulic plunger piston 54 (Fig. 3) is inserted running in a cylinder 53 fitted at the machine frame, said plunger and cylinder serving for absorbing any excess movement of the drive from the press ram. The cylinder 53, which contains oil, communicates with a storage cylinder 55 filled with compressed gas. By this means, after the electric motor 3 is switched off, the press ram 2 is pressed further into the plastification cylinder 10.

To the press ram 2 is connected a cam rod 56 which actuates an electric switch 75 with three switch positions, only shown diagrammatically in the drawing.

The manner of operation of the machine is as follows:

At the beginning of the operational cycle the motor 3 is switched on by the time switch on expiration of the prescribed period of time and the press ram begins its thrust. At this time the previously prepared blown hollow body still lies in the mould (Fig. 1), and the material required for the next operative cycle is weighed and brought in front of the press ram 2. Now, the first switch contact is closed by the cam rod 56 carried with the press ram, which contact actuates electromagnetically a valve 57, only schematically indicated in the drawing and positioned in an air supplying pipe, whereby the supply of air to the blower mandrel is shut off and the blown hollow body is de-aerated.

As the press ram travels on, the motor 21 is switched on by the second contact cam of the cam rod 56 which motor sets in rotation the cam 23. This lifts the push rods 13 with the cutting arms 19 from the position shown in Fig. 1 into the ready position, and as soon as the opened cutting arms 19 arrive against the stop 68 (Fig. 5), further travel of the push rods 13 with the sleeve 15 causes the coarse thread 14 to rotate the cutter arms, thus closing the cutters. Here the cutting plates 20 grip around the tube and cut it through. The tube remains, however, attached to the cutter arms and is still open at the top, as disclosed above.

On the cutter arms 19 (Figure 7) opposite plates 20, and secured thereto by fins 61a, are electro-magnets 62 which electromagnets, when the cutters are closed, are excited via switch 70 and keep the cutters closed.

The tube, cut round and held fast, is now lowered by means of the cutters, by the further movement of the cam plate 23, between the two opened halves of the mould (40, 41) which have been brought, in the meantime, into the opened position shown on Figs. 16 and 2 by bending the toggle joints 35, 36, 37. During the following closure movement of the two halves of the mould, which is controlled by the third contact of the cam rod 56, the cam slot 51 swivels the blower mandrel 42 with the stripping lever over the mould, upon which the cam 49 allows the blower mandrel (Figures 1 and 8) to fall into the tube located inside the mould. At the end of the closure movement of the halves of the mould the lower end of the tube is closed and the part in excess is nipped off, while the upper end is likewise pressed against the blower mandrel 42, the part in excess again being nipped off. The closure movement of the mould is ended by a terminal switch 58, which is actuated by a cam 59 (Fig. 1) on the cam plate shaft 30, while at the same time the magnet compressed air valve 57 is opened and compressed air introduced into the tube 12. The latter is blown up and pressed against the inner wall of the hollow mould (Fig. 1a).

By a further cam of the cam rod 56 the return movement of the press ram 2 is now initiated and this return movement is ended by the cut-out switch 60 which is actuated, in the retracted end position of the press ram, by the contact 60a provided on the shaft 56. Simultaneously a time switch (not shown in the drawings) is switched on, which determines the time till the commencement of the next cycle of operations, that is to say the beginning of the next thrust of the press ram.

In the meanwhile the halves 40, 41 of the mould are again opened, the blower mandrel 42 is lifted by the cam 49, and the prepared hollow body is entrained by the blower mandrel and stripped off from the blower mandrel by the stripper lever 45, which engages the upper surface of the hollow body.

The finished object, stripped off, drops into a collecting container, and the blower mandrel and stripper lever again arrive in their original position.

I claim:

1. A machine for the production of hollow bodies from thermoplastic synthetic material which comprises means for downwardly extruding a tubular body, means for severing the extruded tubular body from the remainder of the material in the extruding means and carrying the severed extruded body in a hanging position while maintaining the upper end of the tubular body open, an openable mould consisting of two sections and spaced from the extruding means for an amount sufficient to permit at least continuous extrusion, means to open and close the mould, means for lowering the said severing means with the severed tubular body longitudinally so as to bring said tubular body to a position between the mould sections while they are open, a mandrel having an air passage therethrough, means to shift said mandrel to a position above and coaxial to the lowered tubular body and to insert said mandrel into the upper end of the said tubular body in the mould before the mould sections are closed, the edges of the mould sections being provided with means for closing the lower end of the tubular body and for calibrating its upper end around said mandrel within the mould when the mould is closed, means for introducing air into the tubular body in the mould through said air passage in the mandrel whereby the tubular body is expanded to the shape of the mould, and means to strip the shaped body from the mandrel after the mould is opened, the cycle of operations utilized permitting the achievement of a continuous bottle-blowing operation with a single mould.

2. A machine as recited in claim 1, wherein said means for severing the extruded tubular body comprises a pair of pivoted arms, a cutter blade on each of said arms, means cooperating with said blades for supporting the tubular body after it is severed, said arms being mounted for vertical movement in the space between the extruding means and the mould, and said means for lowering the tubular body comprises means for lowering the arms from a position adjacent said extruding means to a position adjacent said mould.

3. A machine as recited in claim 2, wherein the mandrel is mounted for vertical and horizontal pivotal movement, and the means to insert the mandrel into the open upper end of the tubular body comprises means for vertically pivoting the mandrel to insert it into the tubular body before the mould is closed and while the tubular body is supported by said supporting means.

4. A machine as recited in claim 3, wherein the stripping means comprises a lever associated with said mandrel and mounted for horizontal pivotal movement, said lever having a portion surrounding the mandrel, said mandrel being vertically movable relative to said portion to strip the shaped body from the mandrel.

5. A machine for producing hollow bodies from thermoplastic synthetic material which comprises an extruder having a downwardly directed nozzle adapted to continuously downwardly extrude a tubular body, a single two-part mould spaced below the nozzle for an amount permitting continuous extrusion, means for opening and closing the mould, vertically movable cutting and supporting means, said cutting and supporting means being positioned for vertical movement in the space between the nozzle and the mould and being constructed and arranged to cooperate with the nozzle to cut the extruded tubular body from the material in the nozzle while maintaining the upper end of the tubular body open and to support the extruded body after it is cut, means for lowering said cutting and supporting means to position the extruded and severed body within the mould, means provided on the mould for closing the lower end and for calibrating the upper end of the tubular body within the mould, and means for blowing the tubular body to the shape of the mould by means of a fluid introduced through the open upper end of the body.

6. A process of producing hollow bodies from thermoplastic synthetic material which comprises downwardly extruding a tubular body, severing the extruded body while maintaining the upper end thereof open, lowering the severed tubular body in a substantially straight line into the confines of an open mould, adjusting a hollow mandrel above the upper open end of the tubular body and inserting it into said upper open end, closing the mould about the tubular body, thereby closing the lower end of the said severed tubular body and calibrating its upper end around said mandrel, blowing the tubular body to the shape of the mould by means of a fluid introduced through the mandrel, opening the mould, and stripping the shaped body from the mandrel.

References Cited in the file of this patent

UNITED STATES PATENTS

| | | |
|---|---|---|
| 2,674,006 | Bailey et al. | Apr. 6, 1954 |
| 2,783,503 | Sherman | Mar. 5, 1957 |
| 2,898,633 | Burch | Aug. 11, 1959 |

FOREIGN PATENTS

| | | |
|---|---|---|
| 1,105,529 | France | Dec. 5, 1955 |
| 744,927 | Great Britain | Feb. 15, 1956 |